United States Patent
Valdes et al.

(10) Patent No.: US 7,379,993 B2
(45) Date of Patent: May 27, 2008

(54) PRIORITIZING BAYES NETWORK ALERTS

(75) Inventors: Alfonso De Jesus Valdes, San Carlos, CA (US); Martin Wayne Fong, San Francisco, CA (US); Phillip Andrew Porras, Cupcatino, CA (US)

(73) Assignee: SRI International, Menlo Park, CA (US)

( * ) Notice: Subject to any disclaimer, the term of this patent is extended or adjusted under 35 U.S.C. 154(b) by 918 days.

(21) Appl. No.: 09/952,080

(22) Filed: Sep. 13, 2001

(65) Prior Publication Data

US 2003/0093514 A1 May 15, 2003

(51) Int. Cl.
*G06F 15/16* (2006.01)

(52) U.S. Cl. ...................................... 709/224

(58) Field of Classification Search ................ 709/224, 709/223, 226, 229; 713/164, 188; 718/102, 718/103; 379/38.09; 726/22, 23, 25
See application file for complete search history.

(56) References Cited

U.S. PATENT DOCUMENTS

| | | | | |
|---|---|---|---|---|
| 5,539,659 | A | 7/1996 | McKee et al. | 364/514 B |
| 6,119,236 | A * | 9/2000 | Shipley | 726/22 |
| 6,370,648 | B1 * | 4/2002 | Diep | 726/22 |
| 6,442,694 | B1 * | 8/2002 | Bergman et al. | 726/22 |
| 6,529,954 | B1 * | 3/2003 | Cookmeyer et al. | 709/224 |
| 6,535,227 | B1 * | 3/2003 | Fox et al. | 715/736 |
| 6,714,967 | B1 * | 3/2004 | Horvitz | 709/206 |
| 6,971,028 | B1 * | 11/2005 | Lyle et al. | 709/224 |
| 2002/0019870 | A1 * | 2/2002 | Chirashnya et al. | 709/224 |
| 2002/0143759 | A1 * | 10/2002 | Yu | 707/5 |
| 2003/0065926 | A1 * | 4/2003 | Schultz et al. | 713/188 |

OTHER PUBLICATIONS

Anderson, Debra et al. "Next-generation Intrusion Detection Expert System (NIDES) Software Users Manual", Dec. 1994.*
DuMouchel, William. "Computer Intrusion Detection Based on Bayes Factors for Comparing Command Transition Probabilities", Feb. 1999.*
Frank, Jeremy. "Artificial Intelligence and Intrusion Detection: Current and Future Directions," Jun. 1994.*
U.S. Appl. No. 60/308,622.*
U.S. Appl. No. 60/308,623.*
Valdes, et al., "Adaptive, Model-based Monitoring for Cyber Attack Detection," Proceedings of Recent Advances in Intrusion Detection 2000 (Raid 2000), H. Debar, L. Me, F. Wu (Eds), Toulouse, France, Springer-Verlang LNCS vol. 1907, pp. 80-92, Oct. 2000.
Valdes, A., "Blue Sensors, Sensor Correlation, and Alert Fusion," http://www.raid-symposium.org/raid2000/Materials/Abstracts/41/avaldes_raidB.pdf, Oct. 4, 2000.

* cited by examiner

*Primary Examiner*—Saleh Najjar
*Assistant Examiner*—Benjamin R. Bruckart

(57) ABSTRACT

This invention uses Bayesian techniques to prioritize alerts or alert groups generated by intrusion detection systems and other information security devices, such as network analyzers, network monitors, firewalls, antivirus software, authentication services, host and application security services, etc. In a preferred embodiment, alerts are examined for the presence of one or more relevant features, such as the type of an attack, the target of an attack, the outcome of an attack, etc. At least a subset of the features is then provided to a real-time Bayes network, which assigns relevance scores to the received alerts or alert groups. In another embodiment, a network manager (a person) can disagree with the relevance score assigned by the Bayes network, and give an alert or alert group a different relevance score. The Bayes network is then modified so that similar future alerts or alert groups will be assigned a relevance score that more closely matches the score given by the network manager.

8 Claims, 6 Drawing Sheets

Message Propagation in a Tree Fragment

Bayes Model for Alert Priority Ranking

Attack Priority Subtree

Asset Relevance Subtree

PRIORITIZING BAYES NETWORK ALERTS

REFERENCE TO GOVERNMENT FUNDING

This invention was made with Government support under contract numbers F30602-99-C-0187 and F30602-99-C-0149 awarded by the Air Force Research Laboratory. The Government has certain rights in this invention.

TECHNICAL FIELD

This invention relates generally to the monitoring of computer networks, and more specifically to alert ranking using real-time Bayes networks.

BACKGROUND

Intrusion detection systems, network analyzers, network monitors, and other information security devices are all used to detect computer network problems. These systems and devices typically generate alerts that identify specific problems or events caused by hacker attacks, hardware failure, operator error, etc.

As networks become larger, the number of alerts generated by a network's intrusion detection systems and other information security devices grows as well. Even when multiple alerts related to a specific event or attack are consolidated into alert groups, it is still difficult for a network manager (a person) to prioritize the alerts, and to act on those alerts that reflect the biggest threat to network operations. And even if a network's intrusion detection systems and other information security devices do not generate a large number of alerts, the network manager may not have sufficient training or experience to prioritize alerts effectively.

U.S. patent application Ser. No. 09/626,547, filed Jul. 25, 2000, entitled "Network Based Alert Management Process," and incorporated herein by reference, describes a system for alert correlation and alert ranking that uses discrete algorithms. Although the system described in that patent application is very effective at ranking alerts, it is not easily adaptable to reflect changes in a network or changes in the security preferences of a network manager.

SUMMARY

Preferred embodiments use Bayesian techniques to prioritize alerts or alert groups generated by intrusion detection systems and other information security devices, such as network analyzers, network monitors, firewalls, antivirus software, authentication services, host and application security services, etc. In one embodiment, alerts are examined for the presence of one or more relevant features, such as the type of an attack, the target of an attack, the outcome of an attack, etc. At least a subset of the features is then provided to a real-time Bayes network, which assigns relevance scores to the received alerts or alert groups.

In another embodiment, a network manager (a person) can disagree with the relevance score assigned by the Bayes network, and give an alert or alert group a different relevance score. The Bayes network is then modified so that similar future alerts or alert groups will be assigned a relevance score that more closely matches the score given by the network manager.

DETAILED DESCRIPTION

I. Introduction

Standard Bayes networks are probabilistic analysis tools that include models (called "hypotheses") that represent some condition or state; probabilistic reasoning methods are used to determine a belief that a current observation corresponds to one of the stored hypotheses. The links between the observations and the hypotheses are coded as conditional probability tables, which will be discussed in more detail below.

In the context of the embodiments described here, a relevant Bayes hypothesis might be "there is a serious problem with the monitored network." In this example, belief in the hypothesis might be strengthened by observing alerts indicating that a critical network resource is the target of a successful hacker attack.

II. Use of Bayes Networks to Rank Alerts

Figure 1:
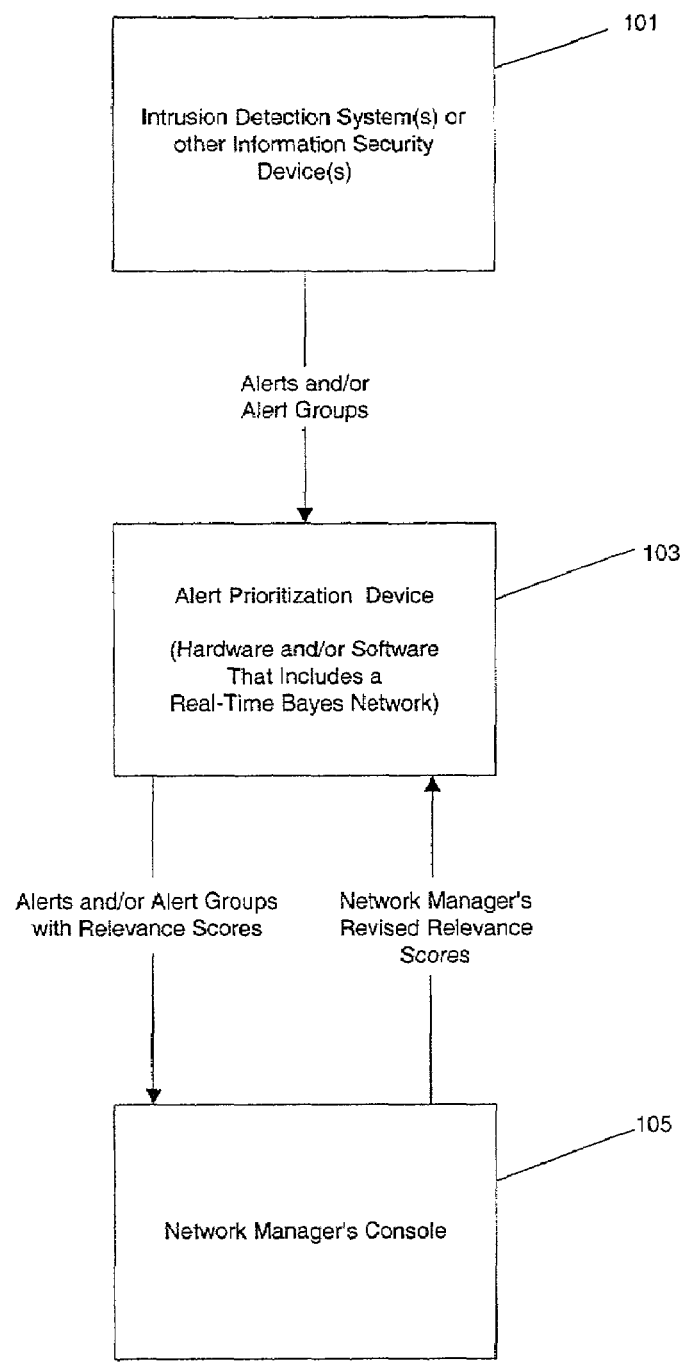
FIG. 1 is a block diagram illustrating a system for prioritizing alerts using a real-time Bayes network.

FIG. 1 is a block diagram illustrating a system for prioritizing alerts using a real-time Bayes network. In this system, an intrusion detection system or other information security device 101 generates alerts in response to hacker attacks, hardware failures, operator error, or other potentially harmful events that take place on a monitored computer network (not shown).

The alerts are then sent to an alert prioritization device 103, which is hardware and/or software that includes a real-time Bayes network. The alert prioritization device 103 may receive individual alerts, or may receive groups of alerts to related to a common attack or event. Alerts may be grouped by the device that generated them, or by some other device such as an alert management interface (not shown) that groups alerts generated by different devices.

The alert prioritization device 103 uses its Bayes network to assign relevance scores to the received alerts or alert groups. The alerts and relevance scores may then be provided to a network manager's console (a computer) 105.

If the network manager disagrees with a relevance score assigned to an alert or alert group, he or she can assign a revised relevance score, which is then provided to the alert prioritization device 103. As will be discussed in more detail below, the revised relevance score can be used to "train" the Bayes network so that similar alerts received later will be assigned a relevance score that more closely matches the score assigned by the network manager.

The alert prioritization device 103 may be part of the intrusion detection system or information security device 101, it may be part of the network manager's console 105, or it may be a separate device that acts as an interface between the two.

Figure 2:
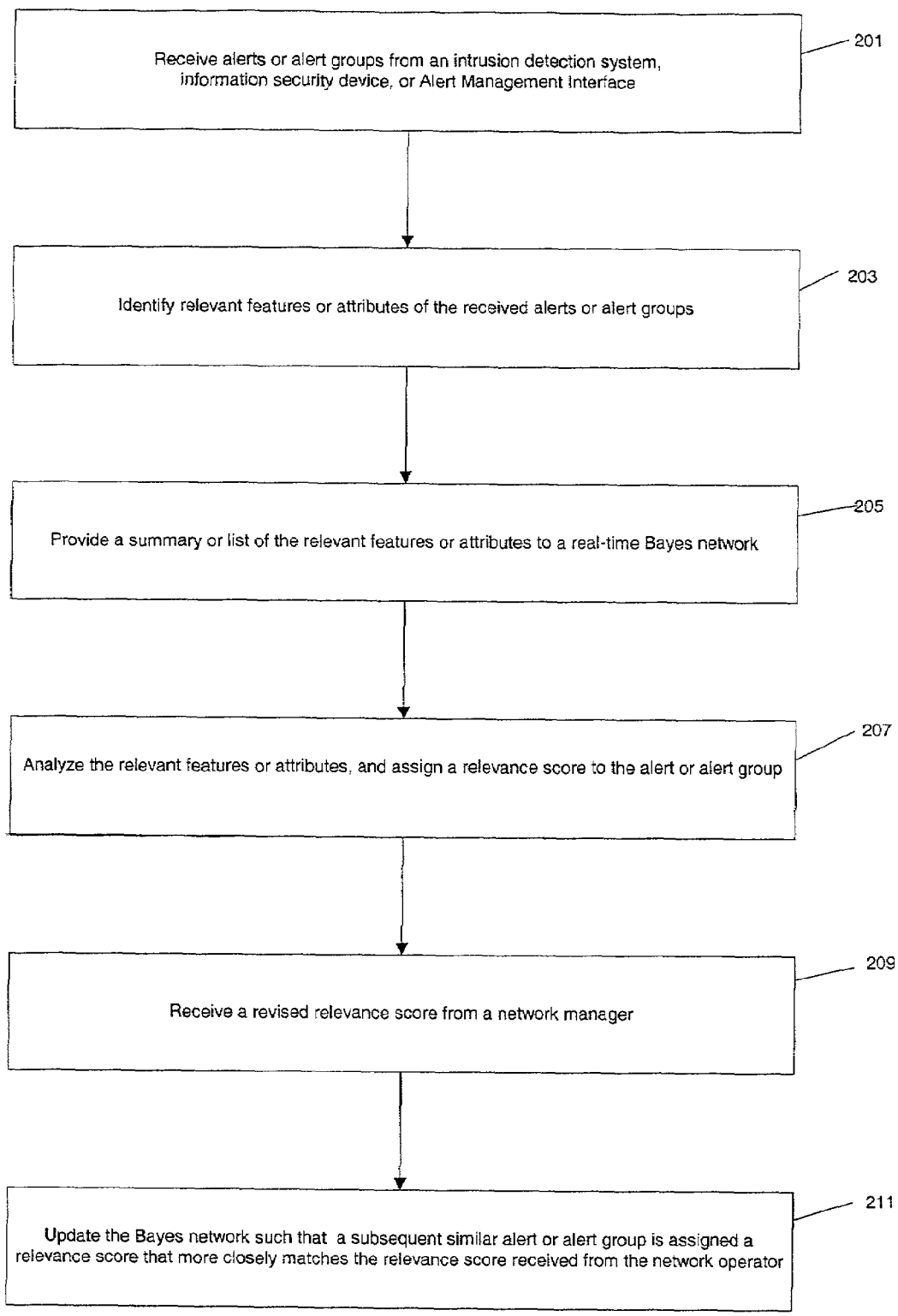
FIG. 2 is a flow chart illustrating a method for prioritizing alerts using a real-time Bayes network.

FIG. 2 is a flowchart showing a preferred method for ranking alerts generated by intrusion detection systems or other information security devices. In this method, alerts or groups of related alerts are received from one or more intrusion detection systems, information security devices, or alert management interfaces (step 201).

The received alerts or alert groups are then examined, and relevant features or attributes of the alerts are identified (step 203). Features are grouped into those referring to attack priority, attack outcome, and asset relevance. Attack priority features consist of the attack incident, the user, the protocol of the attempted exploit, the source, target host, and file. The outcome is a single feature indicating the confidence that the exploit was successful; it may be unknown. Asset relevance considers the operating system (is it vulnerable to the exploit in question), hardware, bound services, and targeted applications. These features are not always available in all alert messages, so only observed features contribute evidence in the Bayes network described in step 205.

At step 205, a summary or list of the features or attributes identified in step 203 are provided to a real-time Bayes network that includes one or more models reflecting the impact of various alert scenarios on effective operation of the network. The Bayes network then analyzes the features or attributes to assign a relevance score to the received alert or alert group (step 207).

If the network manager disagrees with the relevance score assigned to an alert or alert group, he or she may assign the alert or group a revised relevance score that is received by the Bayes network (step 209). The Bayes network is then updated so that a subsequent similar alert or alert group is assigned a relevance score that more closely matches the relevance score received from the network manager (step 211).

III. The Mathematics of Standard Bayes Networks

As was discussed briefly above, Bayes networks use probabilistic reasoning techniques to establish one or more hypotheses based on some body of knowledge. One method for implementing standard Bayes networks uses a framework for belief propagation in causal trees as taught by Judea Pearl in *Probabilistic Reasoning in Intelligent Systems: Networks of Plausible Inference* (1988). In this method, knowledge is represented as nodes in a tree, where each node is considered to be in one of several discrete states.

Figure 3:
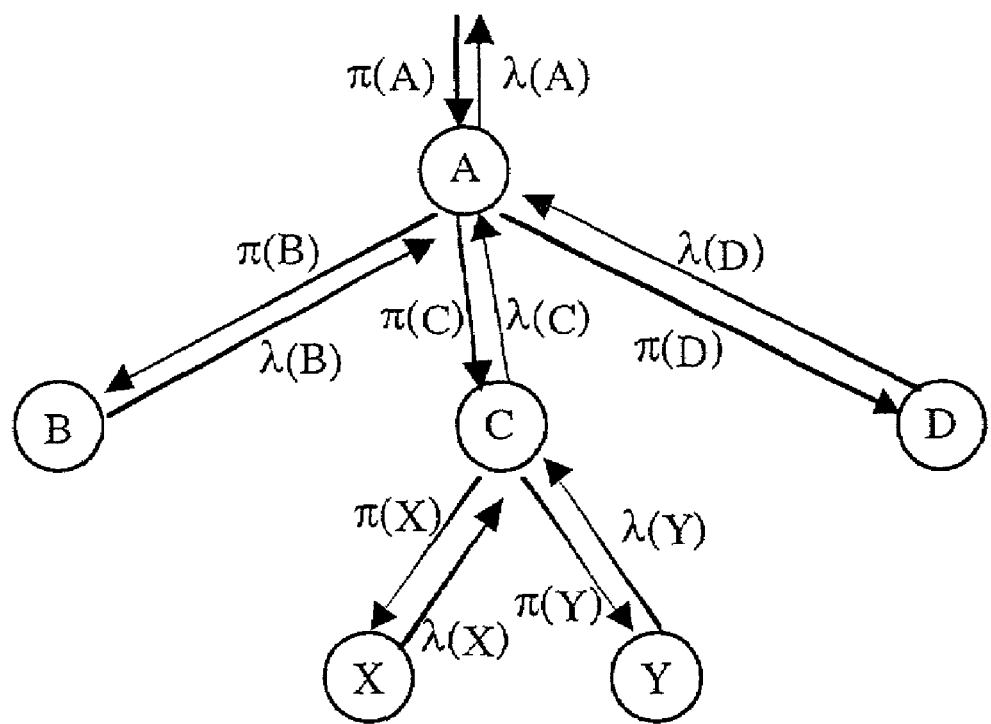
FIG. 3 is a representation of a causal tree as used in a Bayes network.

FIG. 3 is a representation of causal tree (including nodes A-D, X and Y) as used in a Bayes network. In this figure, a node receives $\pi$ (prior, or causal support) messages from a parent node, and $\lambda$ (likelihood, or diagnostic support) messages from one or more child nodes as events are observed. Prior ($\pi$) messages incorporate all information not observed at a particular node. Likelihood ($\lambda$) messages at terminal or "leaf" nodes (such as node X, which has no "child nodes") correspond to direct observations. The hypotheses are included in the root node (a node with no parent node) of the causal tree. Prior messages are viewed as propagating downward through the tree, and likelihood messages are viewed as propagating upward.

A conditional probability table (CPT) links a child node to a parent node. Its elements are given by:

$CPT_{ij}=P(\text{state}=j|\text{parent\_state}=i)$

As a consequence of this definition, each row of a CPT is a discrete distribution over the node states for a particular parent node state. That is:

$CPT_{ij} \geq 0, \forall i,j,$ $$\sum_j CPT_{ij} = 1, \forall j$$

The basic operations of message propagation in the tree are most succinctly expressed in terms of vector/matrix algebra. Prior messages are represented as row vectors, and downward propagation of the prior messages is achieved by left multiplication of the parent's prior message by the CPT. That is:

$\pi(\text{node})=\alpha\pi(\text{parent\_node}) \cdot CPT$ where $\alpha$ is a normalizing constant.

Since a conditional probability table is not required to be square (that is, to have the same number of rows and columns), the number of elements in $\pi(\text{node})$ and $\pi(\text{parent\_node})$ may be different. And since causal trees are used, there is at most one parent per node. However, there may be multiple children for each parent node, so upward propagation of the likelihood ($\lambda$) messages requires a fusion step. For each node, the likelihood ($\lambda$) message, represented as a column vector, is propagated upward via the following matrix computation:

$\lambda\_\text{to\_parent}(\text{node})=CPT \cdot (\lambda(\text{node})+\delta)$ $\delta$ is a column vector whose elements are 0 for mediation nodes, and $1-n_{observed}/n_{siblings}$ for leaf nodes (this de-emphasizes a subtree based upon the number of unobserved children). $\lambda(\text{node})$ has number of elements equal to the number of states in the node, while $\lambda\_\text{to\_parent}(\text{node})$ has number of elements equal to the number of states in the parent node. These messages are fused at the parent via elementwise multiplication:

$L_i(\text{parent})=\Pi_{c \in children(parent)}\lambda\_\text{to\_parent}_i(c)$ $\lambda_i(\text{parent})=L_i(\text{parent})/\Sigma_j L_j(\text{parent})$ Here, L represents the raw elementwise product, and $\lambda$ is obtained by normalizing.

Finally, the belief over the states at a node is obtained as follows:

$BEL_i=\beta\pi_i\lambda_i$ where $\beta$ is a normalizing constant.

As an example of a conditional probability relationship, measurement data might show that half of professional basketball players are over 6'8", while only 2 percent of the general population is this tall. Then:

$P(\text{over 6'8"}|\text{basketball player})=0.5$ $P(\text{over 6'8"}|\text{non-basketball player})=0.02$ This gives rise to the following CPT:

|  | Under 6' 8 | Over 6' 8 |
| --- | --- | --- |
| basketballer | 0.5 | 0.5 |
| non-basketballer | 0.98 | 0.02 |

The parent node in a causal tree contains the hypothesis about an individual (basketball player or not), while the child node contains the observation about the individual's height. The above CPT relates these two nodes. If there are 5 basketball players in a room of 100 people, then the prior probability that an individual is a basketball player is 5%. If a person is drawn at random from this room and he is observed to be over 6'8, the above formalism can be followed to estimate the belief that this individual is a basketball player.

Mathematically, the observation vector is [0, 1], indicating that a tall individual was observed. The likelihood message to the parent node is computed as follows:

$$\lambda\_to\_parent = \begin{bmatrix} 0.5 & 0.5 \\ 0.98 & 0.02 \end{bmatrix} \begin{bmatrix} 0 \\ 1 \end{bmatrix}$$

$$= \begin{bmatrix} 0.5 \\ 0.02 \end{bmatrix}$$

Next, the belief vector is computed:

$$BEL = \beta \begin{bmatrix} \pi(\text{basketballer}) \times \lambda\_to\_parent(\text{basketballer}) \\ \pi(\text{non-basketballer}) \times \lambda\_to\_parent(\text{non-basketballer}) \end{bmatrix}$$

$$= \beta \begin{bmatrix} 0.05 \times 0.5 \\ 0.95 \times 0.02 \end{bmatrix}$$

$$= \beta \begin{bmatrix} 0.025 \\ 0.019 \end{bmatrix}$$

The normalizing constant $\beta$ is chosen so the vector sums to 1, that is, $$1/\beta = 0.025 + 0.019$$
$$= 0.044$$
$$\beta \cong 22.73$$

So that:

$$BEL \cong 22.73 \begin{bmatrix} 0.025 \\ 0.019 \end{bmatrix}$$

$$\cong \begin{bmatrix} 0.56 \\ 0.44 \end{bmatrix}$$

Therefore, the belief vector is approximately [0.56, 0.44], so that the belief that the observed individual is a basketball player is about 56%. So, observing the state "over 6'8"" at the child node causes the belief in the parent node state "basketball player" to increase from the prior belief of 5%, to a belief after the observation of 56%.

IV. The Priority Ranking Model

The analogy to a "knowledge base" in a Bayes system is the set of conditional probability relations, which may be defined according to previously acquired expertise. In a preferred embodiment, these conditional probability relations may be modified by a human expert (such as an experienced network manager) who can revise an alert relevance score assigned by a Bayes network.

Figure 4:
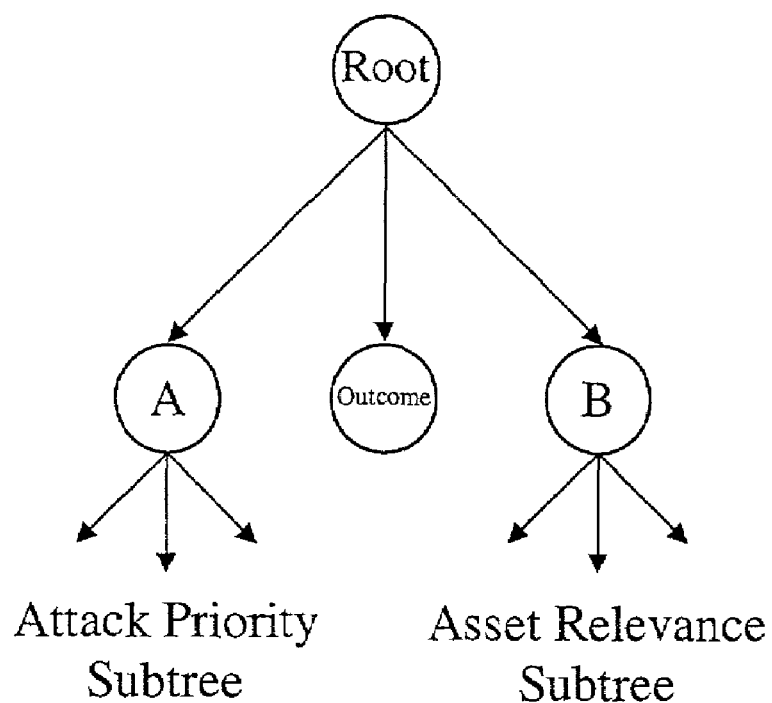
FIG. 4 is a representation of a Bayes model for alert priority ranking.

FIG. 4 shows a preferred model that includes a root node that represents the system output—a priority or relevance ranking, such as "low," "medium," and "high." From the root node there are a number of main branches that represent attribute groupings. These main branches are linked to the root node by what are effectively "pass through" or mediation nodes (such as nodes A and B in this figure), whose function is to weight a subtree (such as an "attack priority" subtree or an "asset relevance" subtree) that corresponds to one of the main branches.

In an embodiment that receives alerts or alert groups generated by an intrusion detection system, there are preferably three main branches from the root node. These branches represent the outcome of an attack (as inferred by the intrusion detection system), the influence of attack attributes on the assigned priority or relevance score (shown as the subtree under node A), and the attack's relevance to network assets (shown as the subtree under node B).

With this model, attributes can be grouped and different groups can have different impact on the output result. The proposed three attribute groups, described in more detail below, are only one possible division; different numbers of attribute groups and more complex branching structures within the attribute groups is possible. Nevertheless, a preferred embodiment with three attribute groups provides a good tradeoff between simplicity and efficacy.

Attack Priority Attributes

Figure 5:
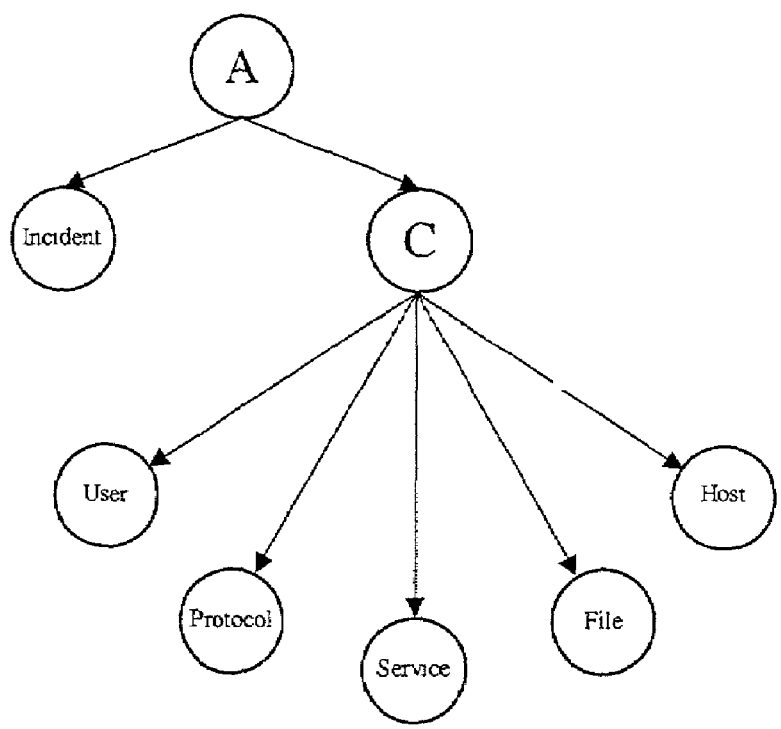
FIG. 5 is a representation of an attack priority subtree of the model shown in FIG. 4.

FIG. 5 is a representation of an attack priority subtree of the model shown in FIG. 4; node A is the same in both figures. One branch of this subtree corresponds to incident priority, that is, the priority of the reported incident based on the security officer's emphasis of the features defined for this branch in step 203 of FIG. 2. The other branch (under node C) is an asset subtree, which in this example identifies five potentially critical assets: user assets, protocol assets, service assets, file assets, and host/subnet assets. Because a given alert may not provide values for all of these attributes; the alert generator or processor preferably passes one of three values to the Bayes network: the attribute was not observed, the attribute was observed and not considered critical, or the attribute was observed and critical.

The criticality of an asset may be based on a configuration file of CPTs that reflects a security policy for the network. The elements of the respective CPTs reflect P(criticality=c|priority=p). In a preferred embodiment, each of these matrices represents two values of criticality by three values of priority. Therefore, the local knowledge base consists of a set of CPTs linking an attribute to the appropriate node on its main branch. If the attribute is not observed in a given alert, the state of the corresponding node is not changed, and thus this attribute does not influence the result (the relevance score assigned to the alert) one way or the other. If this attribute is observed in a subsequent update for the same alert, the system may adjust the previous relevance score to account for the new information.

Asset Relevance Attributes

Figure 6:
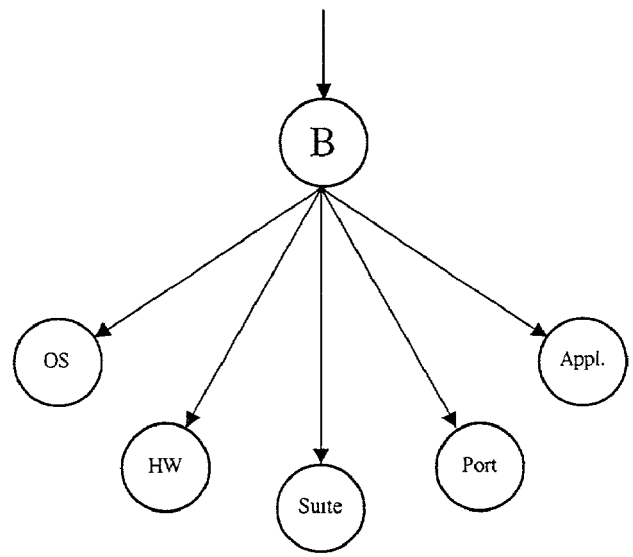
FIG. 6 is a representation of an asset relevance subtree of the model shown in FIG. 4.

FIG. 6 is a representation of an asset relevance subtree of the model shown in FIG. 4; node B is the same in both figures. A preferred embodiment identifies five attributes that are potentially critical: vulnerable operating system, vulnerable hardware, service suite, bound ports, and application. Again, a given alert may not provide values for all of these attributes.

Pass Through Nodes

Nodes A, B, and C of FIGS. 5 and 6 are the roots of distinct subtrees reflecting the influence of different groups of attributes on the relevance score assigned to an alert. These nodes serve a "pass through" function, propagating the subtree results to the root node. If the CPT relating branch nodes A, B, and C to the root node are identity matrices, the evaluation from the subtrees under branch nodes A, B, and C is passed through to the root without alteration.

If the CPT are identity matrices, then all diagonal elements are one and all off-diagonal elements are zero. By setting the diagonal elements slightly less than one and redistributing the difference to the other elements we effectively perturb and downweight the corresponding subtree result, expressing, for example, different subjective assignments of importance or confidence in a particular attribute group. This adaptation of the Bayes network paradigm allows evidence groups to be differentially weighted, which is not strictly needed if the conditional probabilities are well known. However, conditional probabilities are rarely well known.

Adaptive Training

As was discussed in Section III, a conditional probability table (CPT) relates a child node of a causal tree to its parent node, where the rows typically correspond to states of parent nodes, and the columns correspond to states of child nodes.

If only one hypothesis is dominant at the root node of the causal tree, the corresponding row of the CPT matrix may be adapted at each child node slightly in the direction of the likelihood message at the child node for the present observation. Specifically, if a specific hypothesis i "wins" at the root node (that is, its belief is maximal across the set of hypotheses and over some learning threshold), the CPT is adjusted as follows. The system maintains an internal effective count, which is a count of the number of times hypothesis i has won in the past, decayed by an exponential factor $\gamma$:

$$counts_i^{decay} = \gamma counts_i + (1-\gamma)$$

The decayed count is used as a "past weight" for the adjustment, and is the effective number of times this hypothesis has been recently observed. The CPT row is first converted to effective counts for each child state, and the present observation is added as an additional count distributed over the same states. Then the row elements are divided by the row sum so that the adjusted row is normalized. This is accomplished by the following equation:

$$CPT_{ij}^{adj} = \frac{counts_i \times CPT_{ij} + \lambda_j}{\sum_j counts_i \times CPT_{ij} + \lambda_j}$$

Finally, the internal counts are recomputed for all parent states:

$$counts_i = counts_i^{decay} + \begin{cases} \gamma, & \text{hypothesis } i \text{ is the winner} \\ 0, & \text{otherwise} \end{cases}$$

By this procedure, the effective count never decays below 1.0 if the hypothesis is never observed, and never grows beyond $1/(1-\gamma)$ if the hypothesis is always observed. The decay factor is chosen so that the effective count grows to between 200 and 1000 observations. Observations for frequently seen hypotheses have a smaller CPT adjustment than do observations for rare hypotheses. In addition, since only "winning" hypotheses cause a potential CPT adjustment, a large number of observations for a hypothesis corresponding to an attack will not be considered "normal" no matter how frequently it is observed, as its adjustment only reinforces the corresponding internal attack hypothesis model in the system.

The system may be trained in a number of ways. In a preferred embodiment, an interactive program is used that randomly generates alert attribute values and/or allows the specification of pre-determined alert attribute values, and prompts the network manager (or some other expert) for a priority ranking that would be assigned to the simulated alert. This becomes the state value for an ancillary "hard call" mode, whose value forces the call for the Bayes network as a whole. The learning facility is then invoked, and the CPT values adapt accordingly. With reasonable initial values for the CPT, this iterative adaptation can be achieved with far fewer simulated alerts than would be required, for example, to train a neural network from scratch.

V. Alternative Embodiments and Experimental Results

The inventors may present various alternative embodiments and experimental results at a conference in late 2001. Relevant portions of a paper that may be submitted for publication are shown below.

Introduction

In response to attacks and potential attacks against enterprise networks, administrators are increasingly deploying intrusion detection systems (IDS). These systems monitor hosts, networks, critical files, and so forth, using a variety of signature and probabilistic techniques. The use of such systems has given rise to another difficulty, namely, the intelligent management of a potentially large number of alerts from heterogeneous sensors. An important aspect of alert management is the need to rank alerts, so that the administrator can concentrate on the most important alerts. While an expert can rationally prioritize a single alert based on its attribute values, the number of alerts in a realistic environment renders human expert ranking impractical. Additionally, the needed expertise is not available in most enterprises.

The intrusion detection community is actively developing standards for the content of alert messages. See, for example, Erlinger, M. and Stanniford, S. "Intrusion Detection Interchange Format," published by the Internet Engineering Task Force. Systems adhering to these evolving standards agree with respect to attack descriptions and supporting diagnostic data that is forwarded to an alert management interface (AMI), which may be remotely located and consolidating the reports of numerous sensors. In anticipation of these standards, we are developing systems for alert correlation and ranking. In Valdes, A. and Skinner, S., "Blue Sensors, Sensor Correlation, and Alert Fusion," Recent Advances in Intrusion Detection (RAID 2000), Toulouse, France, October 2000, a system for probabilistic alert correlation and close-coupled sensor fusion is presented. In the present document, a Bayes approach to assign a priority ranking to alerts that provide data for several key attributes is presented. This system has the following features:

Ability to weight the priority ranking along several attribute groupings, such as attack type or criticality of assets affected.

Compact representation of the influence of the value of an attribute on the priority assigned.

Incorporation of the administrator's preference profile as to the relative importance of observed values (such as attack type).

Ranking influenced only by those attributes specified on a given alert—in general, a given alert may not observe all possible attributes.

Ability to update the ranking based on observation of a new attribute.

Extensibility of the model to comprehend attributes that may be defined in the future, with minimal perturbation to the rest of the model.

Computationally, our preferred approach is to design a Bayes classifier whose output is a ranking value and whose observable evidence consists of the attribute values. The influence of an attribute on the output is expressed in terms of conditional probability relations.

Bayes approaches and probabilistic formalisms in general, represent a minority of methodologies employed to date by intrusion detection systems as well as evolving systems for correlating and prioritizing alerts from such systems. Theoretically, a probabilistic system needs to specify the entire joint probability distribution of observable attributes and corresponding priority ranking. This is extremely difficult because of the "curse of dimensionality." Instead, the Bayes approach is to assume that dependencies between attributes are local, so a much more compact representation of the system's knowledge base (local conditional probability relations) is possible. With the adaptive capability presented below, we will show how local branches of our model can be independently tuned. The compactness of knowledge representation and the adaptive potential make this approach attractive relative to signature systems.

The remainder of this document is organized as follows. The next section gives an overview of Bayes networks. The priority ranking model itself is then defined. This is followed by a description of the adaptive training approach, wherein the desired result is to duplicate an expert's priority ranking of a given alert. Results of representative alerts processed by an instrumented EMERALD monitor are then presented. The EMERALD monitor is described in Porras, P. and Neumann, P. "EMERALD: Event Monitoring Enabling Responses to Anomalous Live Disturbances," National Information Security Conference, 1997.

Bayes Networks

The framework for belief propagation in causal trees has been adapted from Pearl, J. "Probabilistic Reasoning in Intelligent Systems," Morgan-Kaufmann (1988). Knowledge is represented as nodes in a tree, where each node is considered to be in one of several discrete states. A node receives $\pi$(prior, or causal support) messages from its parent, and $\lambda$(likelihood, or diagnostic support) messages from its children as events are observed. Priors are thought of as propagating downward through the tree, and likelihood as propagating upward. These are discrete distributions; that is, they are positive valued and sum to unity. The prior message incorporates all information not observed at the node. The likelihood at terminal or "leaf" nodes corresponds to the directly observable evidence. A conditional probability table (CPT) links a child to its parent. Its elements are given by $CPT_{ij} = P(\text{state}=j|\text{parent\_state}=i)$ As a consequence of this definition, each row of a CPT is a discrete distribution over the node states for a particular parent node state; that is, $CPT_{ij} \geq 0, \forall i,j,$ $$\sum_j CPT_{ij} = 1, \forall j$$

The basic operations of message propagation in the tree are most succinctly expressed in terms of vector/matrix algebra. Prior messages are typically represented as row vectors. Downward propagation of the prior messages is achieved by left multiplication of the parent's prior by the CPT; that is, $\pi(\text{node}) = \alpha \pi(\text{parent\_node}) \cdot CPT$ where $\alpha$ is a normalizing constant to ensure that the result sums to unity. Note that because a CPT is not required to be a square matrix, the number of elements in $\pi$(node) and $\pi$(parent_node) may be different. Because we limit ourselves to trees, there is at most one parent per node. However, because there may be multiple children, upward propagation of the likelihood messages requires a fusion step. For each node, the $\gamma$ message, represented as a column vector, is propagated upward via the following matrix computation:

$\lambda\_\text{to\_parent(node)} = CPT \cdot (\lambda(\text{node}) + \delta)$

Note that $\lambda$(node) has number of elements equal to the number of states in the node, while $\lambda$_to_parent(node) has number of elements equal to the number of states in the parent node. $\delta$ is a column vector whose elements are 0 for mediation nodes, and $1 - n_{observed}/n_{siblings}$ for leaf nodes (this de-emphasizes a subtree based upon the number of unobserved children). These messages are fused at the parent via elementwise multiplication:

$L_i(\text{parent}) = \Pi_{c \in \text{children(parent)}} \lambda\_\text{to\_parent}_i(c)$ $\lambda_i(\text{parent}) = L_i(\text{parent})/\Sigma_j L_j(\text{parent})$ Here, L represents the raw elementwise product, and $\lambda$ is obtained by normalizing this to unit sum. Finally, the belief over the states at a node is obtained as follows:

$BEL_i = \beta \pi_i \lambda_i$ where $\beta$ is a normalizing constant ensuring that BEL has unit sum. FIG. 3 illustrates propagation in a fragment of a tree.

Finally, for both root and mediation nodes, the belief over the states at a node is weighted and summed to produce a numeric score.

The Priority Ranking Model

The system presented here addresses two problems that arise in IDS alert prioritization. The first is that, while a domain expert can assign a priority to an alert that would generally agree with that assigned by other domain experts, the volume of alerts in a realistic environment with multiple IDS makes it impossible to examine each alert in detail. Second, the depth of IDS domain expertise does not at present exist in most enterprise networks. Our goal is to be able to process a large number of alerts and produce a priority ranking with which a domain expert would agree. The analogy to a "knowledge base" in a Bayes system is the set of conditional probability relations. We have taken the approach of defining these according to our own domain expertise. We recognize that representation of attribute relations as conditional probabilities represents an abstraction from the expert's reasoning process. Therefore, we use this initial representation as a starting point, and provide an adaptive capability that enables the expert to modify the system's "call." Although this requires domain knowledge on the part of the expert, it does not require special knowledge of Bayes systems.

Our preferred model consists of a root node representing the output priority ranking (presently, "low," "medium," and "high"). From the root there are a number of main branches representing attribute groupings. These are linked to the root node by what are effectively "pass through" or mediation nodes, whose function is to weight the subtree corresponding to the principal branch. This differential weighting is one of the desirable features of our system.

In the present implementation, there are three main branches connecting to nodes, representing sensor-inferred attack outcome, the influence of the attack attributes on the priority (including asset criticality), and the attack's relevance. Under the first node (node A in FIG. 4) is a leaf node expressing the relationship of attack-specific attributes to the ranking and a subtree expressing the criticality of asset classes referenced by an attack. Under the third node (node B in FIG. 4) are leaf nodes representing topologically sensitive assets. This representation of attribute groupings as major branches from the root allows for subjective weighting relative in importance to the attributes in question. The relative weighting of the major branches is achieved by the "pass through" action of nodes A and B, as discussed in more detail below.

With this model, attributes can be grouped and different groups can have different impact on the output result. The proposed three attribute groups, described in the next subsections, are only one possible division. There may be more than three attribute groups, and there may be an even more complex branching structure within the attribute groups. Nevertheless, this proposed model provides a good tradeoff between simplicity and efficacy.

Attack Priority Attributes

FIG. 5 represents the subtree that relates attack priority to alert ranking. One branch of this subtree corresponds to incident priority, which has one of three values, ranging from low to high. The other branch is an asset subtree, which contains five potentially critical assets: user, protocol, service, file, and host/subnet. A given alert may not provide values for all these attributes. For example, in Valdes, A. and Skinner, S. "Adaptive, Model-based Monitoring for Cyber Attack Detection," Recent Advances in Intrusion Detection (RAID 2000), Toulouse, France, October 2000, the TCP session monitor does not examine user or file. Therefore, for any of these attributes, the alert processor passes to our preferred model one of three values: the attribute was not observed, the attribute was observed and not considered critical, and the attribute was observed and critical. Criticality of an asset is based on a configuration file that reflects security policy. Our preferred model supports dynamic change to the security policy. The elements of the respective CPTs reflect P(criticality=c|priority=p). Each of these matrices represents two values of criticality by three values of priority. Therefore, the local knowledge base consists of a set of CPTs linking the attribute to the appropriate node on its main branch. If the attribute is not observed in a given alert, the state of the corresponding node is not changed, and thus this attribute does not influence the result one way or the other. If this attribute is observed in a subsequent update for the same alert, the system adjusts the previous prioritization for the new information. Compact representation, use of only the observed attributes, and update of an existing result to comprehend new information are all desirable features of a system of this type.

Asset Relevance Attributes

FIG. 6 represents the subtree that relates asset relevance to alert ranking. A preferred model identifies five attributes that are potentially critical: vulnerable OS, vulnerable hardware, service suite, bound ports, and application. Again, a given alert may not provide values for all of these attributes.

Pass Through Nodes

Nodes A, B, and C of FIGS. 4, 5, and 6 are the roots of distinct subtrees reflecting the influence of different groups of attributes on the desired result. These nodes serve a "pass through" function, propagating the subtree result to the root. If the CPT relating these major branch nodes to the root are identity matrices, the evaluation from the leaves under the branch is passed through without alteration. Moving mass off the diagonal effectively perturbs and downweights the corresponding subtree result, expressing, for example, different subjective assignments of importance or confidence in a particular attribute group. This adaptation of the Bayes net paradigm allows evidence groups to be differentially weighted, which is not strictly needed if the conditional probabilities are well known. Unfortunately, in practice, conditional probabilities are seldom well known.

Adaptive Training

The Bayes inference engine used here has an adaptive capability described in Valdes, A. and Skinner, S., "Adaptive, Model-based Monitoring for Cyber Attack Detection," Recent Advances in Intrusion Detection (RAID 2000), Toulouse, France, October 2000, which is incorporated herein by reference. Briefly stated, the system behaves as if the CPTs are based on effective counts. If a hypothesis (priority assignment) "wins" (posterior belief above a settable learning threshold), entries in the CPTs are adjusted slightly in the direction of the observation (which are really the likelihood messages at the leaf nodes). The effective count for the winning hypothesis is aged (multiplied by a decay factor) and incremented by one for the current observation. The effective counts for other hypotheses are aged. Therefore, frequently observed hypotheses approach a saturation count, and as the adjustment depends on the effective count, new observations perturb the current CPT only slightly. Conversely, a very rarely observed hypothesis adapts more quickly to new observations, as its effective count decays to a lower value and thus assigns less weight to past values. This can be thought of as hypothesis-specific annealing.

To utilize this in the present system, there is an interactive facility that randomly generates, and allows the specification of pre-determined, attribute values and prompts the operator for the priority ranking that would be assigned to the alert in question. This becomes the state value for an ancillary "hard call" node, whose value forces the call for the net as a whole. The learning facility is then invoked, and the CPT values adapt accordingly. With reasonable initial values for the CPT, and based on our expert judgment in this area, this iterative adaptation can be achieved with far fewer simulated alerts than would be required to, for example, train a neural net from scratch.

Results

In the following, the Bayes net was conditioned to emphasize asset priority by de-emphasizing the outcome, incident, and relevance nodes. The protocol, service, service suite, and application attributes are all unobserved; and the priority, relevance, and ranking scores range from 0 through 100:

| Input Observations | | | | | | | | | | | |
|---|---|---|---|---|---|---|---|---|---|---|---|
| Incident | L | L | L | L | L | M | M | M | M | H | H |
| Target IP | Y | N | N | N | N | N | N | Y | Y | N | Y |
| Source User | Y | Y | Y | N | N | N | N | Y | Y | N | Y |
| Bound Port | N/A | N/A | N | N | Y | N | N | N | N | Y | Y |
| Vuln. OS | Y | N | N/A | N/A | N/A | N | N | N | N | Y | Y |
| Vuln. Arch. | N/A | N/A | N/A | N/A | N/A | N/A | N/A | N/A | N/A | Y | Y |
| Outcome | Y | N | Y | N | Y | N | Y | N | Y | N | Y |

| Output Results | | | | | | | | | | | |
|---|---|---|---|---|---|---|---|---|---|---|---|
| Priority | 14 | 14 | 14 | 6 | 6 | 25 | 25 | 37 | 37 | 83 | 88 |
| Relevance | 62 | 38 | 38 | 38 | 62 | 24 | 24 | 24 | 24 | 88 | 88 |
| Ranking | 40 | 11 | 30 | 6 | 31 | 17 | 33 | 27 | 44 | 74 | 96 |
| Order | 4 | 10 | 7 | 11 | 6 | 9 | 5 | 8 | 3 | 2 | 1 |

These results closely matched our resident domain expert's expectation.

What is claimed is:

1. In a computer network having an information security device that generates alerts when attacks or anomalous incidents are detected, a method for prioritizing alerts comprising the steps of:
receiving alerts from the information security device;
examining the received alerts for the presence of one or more relevant features;
providing a summary or list of the features from at least a subset of the received alerts to a Bayes network for analysis; and
assigning priority scores to at least a subset of the received alerts, the priority scores reflecting an importance of an associated alert relative to other alerts and being based at least in part on the analysis performed by the Bayes network,
where the Bayes network uses conditional probability tables (CPTs) to model potential influence of alert features on the priority scores, the CPTs including one or more rows that correspond to priority score states and one or more columns that correspond to alert feature states such that an element at an intersection of a row and a column of a CPT represents a likelihood of a priority score state given an alert feature state, where the CPTs are adjusted in response to a dominant priority score by adapting a first row of the CPT, the first row of the CPT corresponding to the dominant priority score, to increase a measure of likelihood of the dominant priority score across alert feature states represented in the first row, the adapting comprising:
converting each element in the first row of the CPT to an effective count to produce one or more effective counts, an effective count indicating a number of times that the dominant priority score has been observed for a corresponding alert feature state, wherein the dominant priority score is added as an additional effective count distributed over the alert feature states represented in the first row;
normalizing the first row of the CPT; and
recomputing the one or more effective counts for all priority score states.

2. The method of claim 1 wherein the features are selected from the following group:
attack or incident type;
attack or incident outcome;
attack or incident source;
the information security device's confidence level in the attack or incident type and attack or incident outcome; and
network assets affected by the attack or incident.

3. The method of claim 1 wherein the CPTs include asset relevance information that includes one or more vulnerabilities selected from the following group:
an asset's operating system vulnerabilities;
an asset's hardware vulnerabilities; and
an asset's application vulnerabilities.

4. The method of claim 3 further comprising the steps of:
comparing the priority score with a second priority score provided by a network operator; and
adding a new row, weighted towards the second priority score, to one or more of the CPTs.

5. The method of claim 1, wherein an amount that a CPT is adjusted in response to a dominant priority score is inversely proportional to a frequency with which the dominant priority score is observed.

6. The method of claim 1, wherein the normalizing comprises:
summing all elements in the first row of the CPT to produce a sum; and dividing each element in the first row of the CPT by the sum.

7. In a computer network that has a plurality of information security devices, each of which generates alerts when attacks or anomalous incidents are detected, a method for prioritizing groups of related alerts comprising the steps of:
receiving the groups of related alerts;
examining the received groups for the presence of one or more relevant features;
providing a summary or list of the features from at least a subset of the received groups to a Bayes network for analysis; and
assigning priority scores to at least a subset of the received groups, the priority scores reflecting an importance of an associated alert relative to other alerts and being based at least in part on the analysis performed by the Bayes network,
where the Bayes network uses conditional probability tables (CPTs) to model potential influence of alert features on the priority scores, the CPTs including one or more rows that correspond to states of the priority scores and one or more columns that correspond to states of the alert features such that an element at an intersection of a row and a column of a CPT represents a likelihood of a priority score state given an alert feature state, where the CPTs are adjusted in response to a dominant priority score by adapting a first row of the CPT, the first row of the CPT corresponding to the dominant priority score, to increase a measure of likelihood of the dominant priority score across alert feature states represented in the first row, the adapting comprising:

converting each element in the first row of the CPT to an effective count to produce one or more effective counts, an effective count indicating a number of times that the dominant priority score has been observed for a corresponding alert feature state, wherein the dominant priority score is added as an additional effective count distributed over the alert feature states represented in the first row;

normalizing the first row of the CPT; and recomputing the one or more effective counts for all priority score states.

8. In a computer network having an information security device that generates alerts when attacks or anomalous incidents are detected, a method for assigning a priority score to alerts comprising the steps of:

receiving a first alert;

examining the first alert for the presence of one or more relevant features;

providing a summary or list of the features from the first alert to a Bayes network for analysis;

assigning a priority score to the first alert, the priority score reflecting an importance of an associated alert relative to other alerts and being based at least in part on the analysis performed by the Bayes network, where the Bayes network uses conditional probability tables (CPTs) to model potential influence of alert features on the priority scores, the CPTs including one or more rows that correspond to states of the priority scores and one or more columns that correspond to states of the alert features such that an element at an intersection of a row and a column of a CPT represents a likelihood of a priority score state given an alert feature state, where the CPTs are adjusted in response to a dominant priority score by adapting a first row of the CPT, the first row of the CPT corresponding to the dominant priority score, to increase a measure of likelihood of the dominant priority score across alert feature states represented in the first row, the adapting comprising:

converting each element in the first row of the CPT to an effective count to produce one or more effective counts, an effective count indicating a number of times that the dominant priority score has been observed for a corresponding alert feature state, wherein the dominant priority score is added as an additional effective count distributed over the alert feature states represented in the first row:

normalizing the first row of the CPT; and recomputing the one or more effective counts for all priority score states;

receiving a second priority score from a network operator, the second priority score reflecting an importance of the first alert relative to other alerts; and modifying the Bayes network such that when a subsequent alert similar to the first alert is analyzed by the Bayes network, the subsequent alert is assigned a priority score that more closely matches the second priority score.

* * * * *